(12) United States Patent
Melrose et al.

(10) Patent No.: US 7,561,370 B2
(45) Date of Patent: Jul. 14, 2009

(54) SEAM TO SEAM EMBEDDED RUNOUT CORRECTION PROPAGATION

(75) Inventors: Thomas O. Melrose, Longmont, CO (US); Bruce Liikanen, Berthoud, CO (US); John C. Purkett, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/846,409

(22) Filed: Aug. 28, 2007

(65) Prior Publication Data

US 2009/0059420 A1    Mar. 5, 2009

(51) Int. Cl.
*G11B 5/596* (2006.01)
(52) U.S. Cl. .................................... 360/77.04
(58) Field of Classification Search .............. None
See application file for complete search history.

(56) References Cited

U.S. PATENT DOCUMENTS

| | | | |
|---|---|---|---|
| 6,369,974 B1 * | 4/2002 | Asgari et al. | 360/78.14 |
| 6,608,731 B2 | 8/2003 | Szita | |
| 6,654,198 B2 | 11/2003 | Liu et al. | |
| 6,965,491 B1 | 11/2005 | Perlmutter et al. | |
| 6,977,792 B1 * | 12/2005 | Melrose et al. | 360/75 |
| 7,054,096 B1 | 5/2006 | Sun et al. | |
| 7,271,977 B1 * | 9/2007 | Melrose et al. | 360/77.04 |
| 7,286,317 B1 * | 10/2007 | Li et al. | 360/77.04 |
| 7,315,431 B1 * | 1/2008 | Perlmutter et al. | 360/77.04 |

* cited by examiner

*Primary Examiner*—K. Wong
(74) *Attorney, Agent, or Firm*—Fellers, Snider, et al.

(57) ABSTRACT

Various embodiments of the present invention are generally directed to propagating repeated runout (RRO) correction values for radially concentric servo seams on a storage medium in relation to an RRO correction value for an adjacent seam and a radial separation between the seams.

20 Claims, 7 Drawing Sheets

US 7,561,370 B2

SEAM TO SEAM EMBEDDED RUNOUT CORRECTION PROPAGATION

BACKGROUND

The present case is generally directed to data storage, and more particularly, to improving servo control for a data storage medium.

Repeated runout (RRO) error in servo data can generally have an adverse effect on servo control of a control object, such as a transducer adjacent a storage medium. RRO correction values can be determined to compensate for such RRO errors, but the determination of such values can be time and resource intensive, particularly in high volume automated manufacturing environments.

SUMMARY

Various embodiments of the present invention are generally directed to propagating repeated runout (RRO) correction values for radially concentric servo seams on a storage medium in relation to a correction value for an adjacent seam and a radial separation between the seams.

In accordance with some embodiments, a method generally comprises obtaining a first repeated runout (RRO) correction value for a first servo seam on a storage medium to compensate for a radial offset between an actual position and a desired position of the first servo seam. A distance value is determined indicative of a radial distance between the actual position of the first servo seam and an actual position of a second servo seam on the medium. A second RRO correction value for the second servo seam is then generated to compensate for a radial offset between the actual position and a desired position for the second servo seam, the second error correction value determined in relation to the first error correction value and the radial distance value.

In accordance with other embodiments, an apparatus generally comprises a servo controller configured to obtain a first repeated runout (RRO) correction value for a first servo seam on a storage medium to compensate for a radial offset between an actual position and a desired position of the first servo seam. The servo controller is further generally configured to estimate a second RRO correction value for an adjacent second servo seam on the medium in relation to the first RRO correction value and a distance value indicative of a radial distance between the actual position of the first servo seam and an actual position of the second servo seam on the medium.

In accordance with other embodiments, an apparatus generally comprises a storage medium on which a plurality of radially concentric servo seams are disposed, and first means for obtaining a first repeated runout (RRO) correction value for a first servo seam of said plurality compensate for a radial offset between an actual position and a desired position of the first servo seam, and to generate a second RRO correction value for an adjacent second servo seam of said plurality in relation to the first RRO correction value and a distance value indicative of a radial distance between the actual position of the first servo seam and an actual position of the second servo seam on the medium.

DETAILED DESCRIPTION

Figure 1:
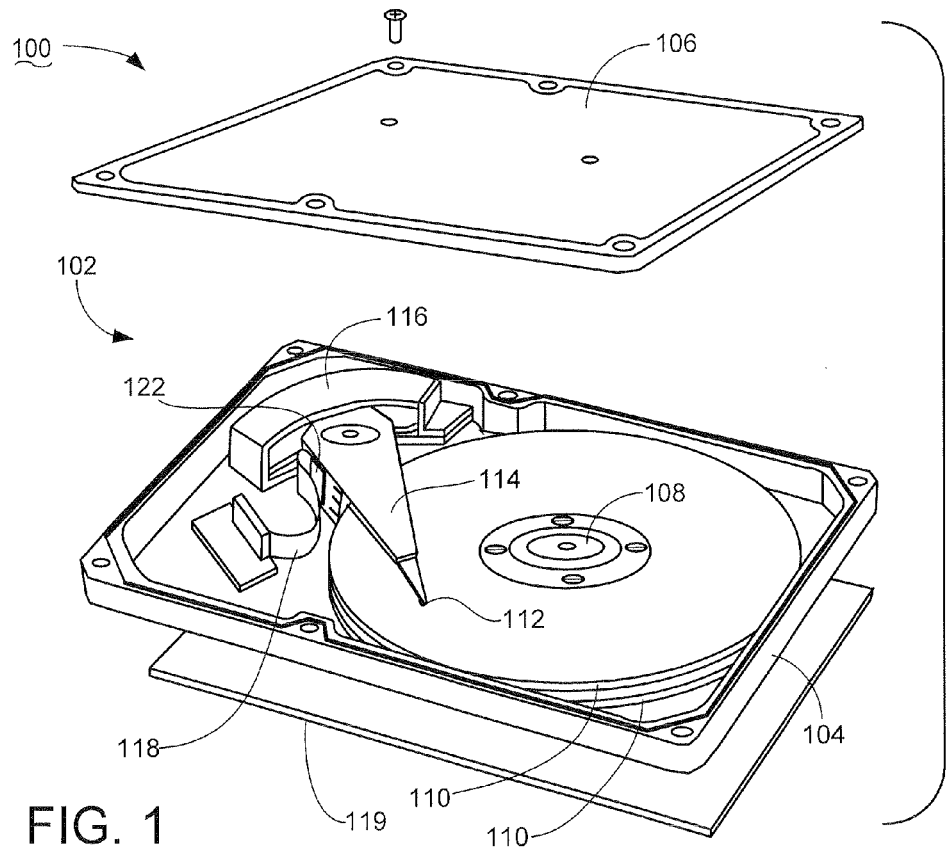
FIG. 1 is an exploded isometric view of an exemplary data storage device in which various embodiments of the present invention can be advantageously practiced.

FIG. 1 provides a top plan view of a data storage device 100. The device 100 is characterized as a hard disc drive and is provided to show an exemplary application in which various embodiments of the present invention may be utilized. It will be understood, however, that the claimed invention is not so limited.

The device 100 includes a housing 102 formed from a base deck 104 and top cover 106. A spindle motor 108 rotates a number of storage media 110 at a constant high speed. The media 110 are accessed by a corresponding array of data transducers 112 supported by a movable actuator 114. The actuator 114 pivots via a voice coil motor 116 to align the transducers 112 with tracks defined on the media surfaces. A flex circuit assembly 118 provides electrical communication paths between the actuator 114 and device control electronics on an externally disposed printed circuit board (PCB) 119.

Figure 2:
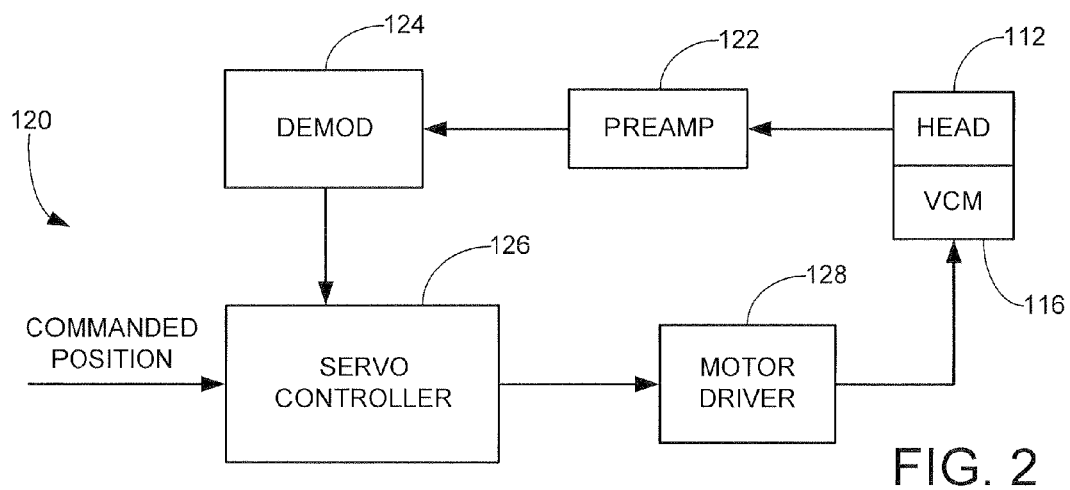
FIG. 2 provides a functional representation of a closed loop servo control circuit of the device of FIG. 1.

FIG. 2 provides a generalized functional block diagram for a closed loop servo control circuit 120 of the device 100. Embedded servo data are transduced from the media 110 by a selected transducer (head) 112 and provided to a preamplifier/driver (preamp) circuit 122.

The preamp circuit 122 preamplifies and filters the readback signals from the transducer 112, and provides the processed servo data to a demodulation (demod) circuit 124. The demod circuit 124 operates to detect and conditions the servo data, including application of automatic gain control (AGC) and conversion of the signals to digital form.

A servo controller 126 processes the digitized servo data to generate a current command signal that is supplied to a motor driver circuit 128. In response, the driver circuit 128 applies the appropriate current to the VCM 116 to position the transducer 112. The servo controller 126 is preferably characterized as a programmable processor with associated servo code to direct the operation of the servo loop, although the servo controller 126, or portions thereof, can alternatively be realized in hardware.

Figure 3:
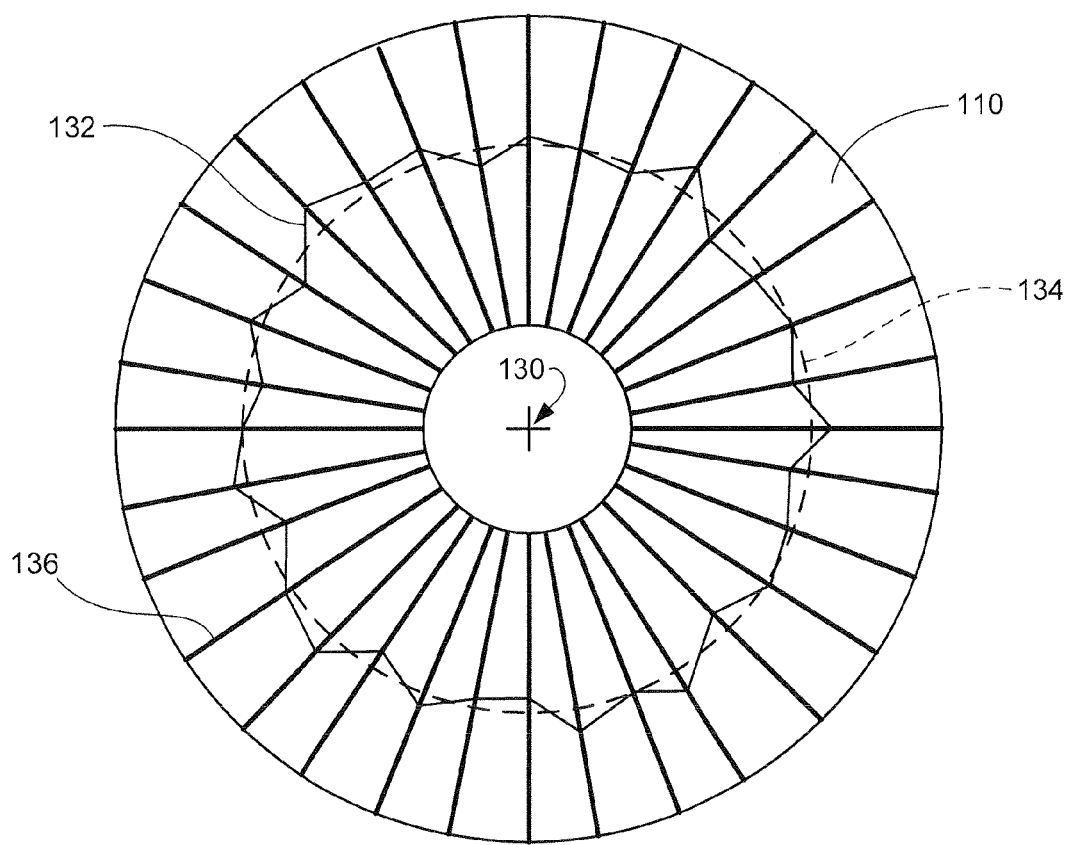
FIG. 3 is a top down diagrammatic view of a data storage medium of the device of FIG. 1.

FIG. 3 provides a top down diagrammatic view of a selected magnetic storage medium 110 of the device 100 of FIG. 1. The medium 110 is preferably substantially circular in shape and includes a central rotational axis 130.

The medium 110 is contemplated as including plurality of concentric data tracks to which user data are stored. For purposes of illustration, only a single data track 132 is shown, with an exaggerated amount of perturbation (repeated runout error, or RRO). The RRO is induced by errors in the placement of servo data that would otherwise nominally define an ideal circular path on the medium 110, as indicated by track 134.

The servo data are preferably arranged as a series of spaced apart servo wedges 136 that radially extend across the media 110 like spokes of a wheel to provide embedded servo sectors along the track 134. It will be recognized that FIG. 3 is a simplified diagram, in that a larger number of servo sectors per track, such as in the range of 200-400, may actually be used.

Figure 4:
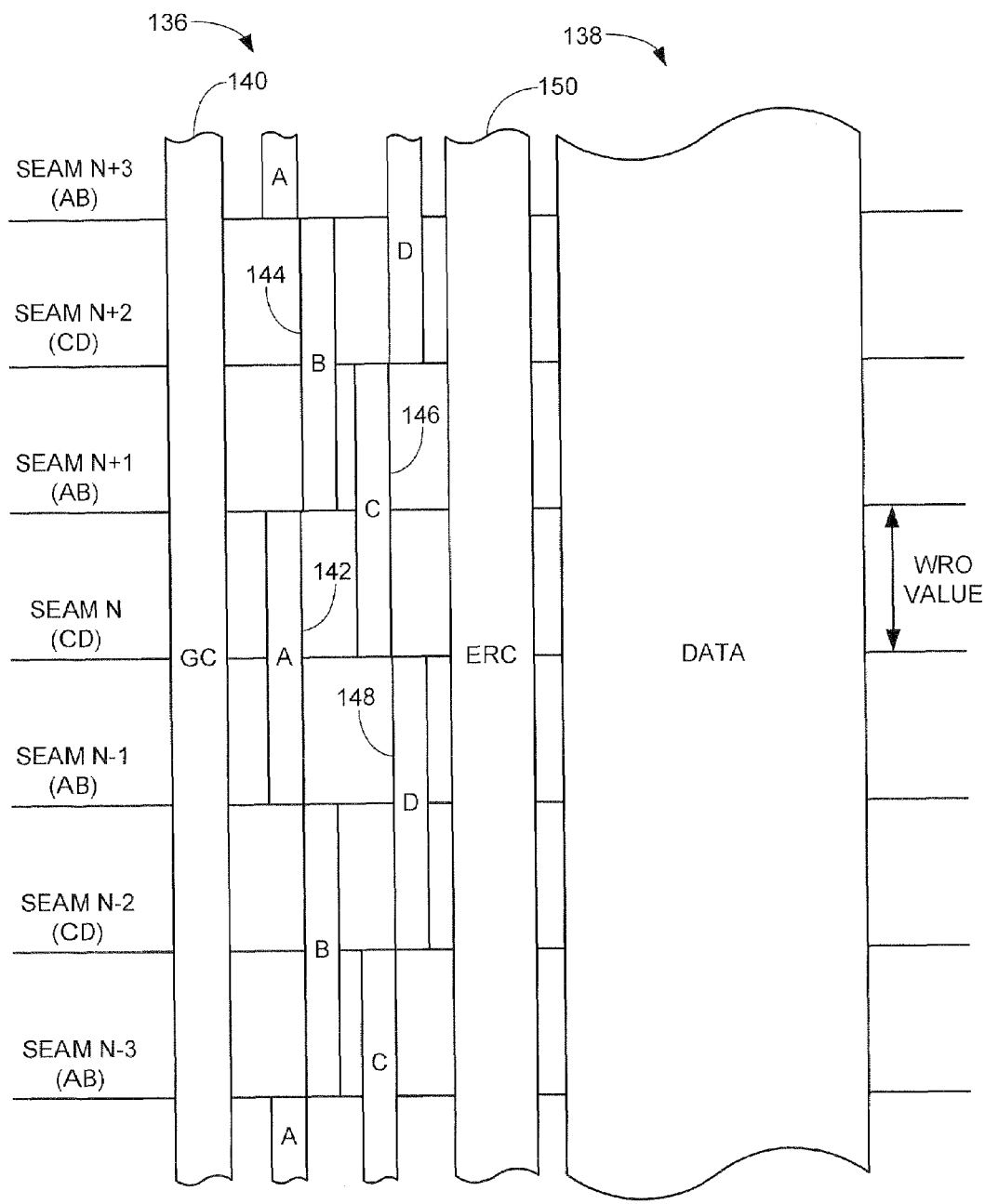
FIG. 4 generally represents portions of the data storage medium with ideally placed servo seams.

Portions of one of the servo wedges 136 are shown in greater detail in FIG. 4. FIG. 4 also shows an adjacent user data region to which user data are stored at 138.

The servo data are shown to preferably include a Gray code (GC) block 140 to provide track addressing information to the servo circuit 120. Servo burst blocks (also referred to as dibit patterns and servo burst patterns) are identified as A, B, C, D patterns 142, 144, 146 and 148. The patterns provide fine positional information to the servo circuit 120. An embedded runout correction (ERC) block is shown at 150 and is used to store ERC values as explained below.

While a quadrature (ABCD) pattern is shown in FIG. 4, this is merely exemplary in nature, as any number of different servo formats and arrangements can be utilized as desired. The servo data are preferably written during device manufacturing using a servo track writer (STW), although the device can alternatively use a self-servo write process (with or without seed tracks from an STW) to generate the servo data.

A number of servo seams are denoted from N−3 to N+3. Each servo seam nominally represents a junction, or seam, between adjacent ones of the ABCD patterns; for example, seam N is at a CD junction, seam N+1 is at the next radial AB junction, and so on. Preferably, each seam will be nominally aligned at the same radial position in each of the servo spokes 136 around the circumference of the medium 110, thereby defining an ideal circular path such as represented by ideal track 134 in FIG. 2.

A written in runout (WRO) value generally relates to the radial distance between the actual locations of each pair of adjacent seams. The servo write process preferably attempts to provide the same target WRO value for each pair of adjacent seams, so that the data nominally match that shown in FIG. 4.

During device operation, the associated transducer reads the servo burst patterns as the medium 110 rotates adjacent the transducer. The recovered burst data are demodulated and fed into the servo loop to provide an indication of the actual location of the transducer 112 with respect to the adjacent seams.

A position error signal (PES) is generated in relation to the error between the actual position and a commanded position, and a correction signal is output to the VCM driver to minimize the PES. Preferably, the servo controller provides 256 steps, or increments, across each WRO interval, and relies on the WRO being nominally consistent in order to provide a nominally linear PES.

Accordingly, it will be appreciated that errors in the locations of the servo seams can induce RRO and non-linearities in the operation of the servo circuit 120, thereby causing RRO disturbances in the positioning of the transducer. Exemplary types of seam errors are generally depicted in FIG. 5.

Figure 5:
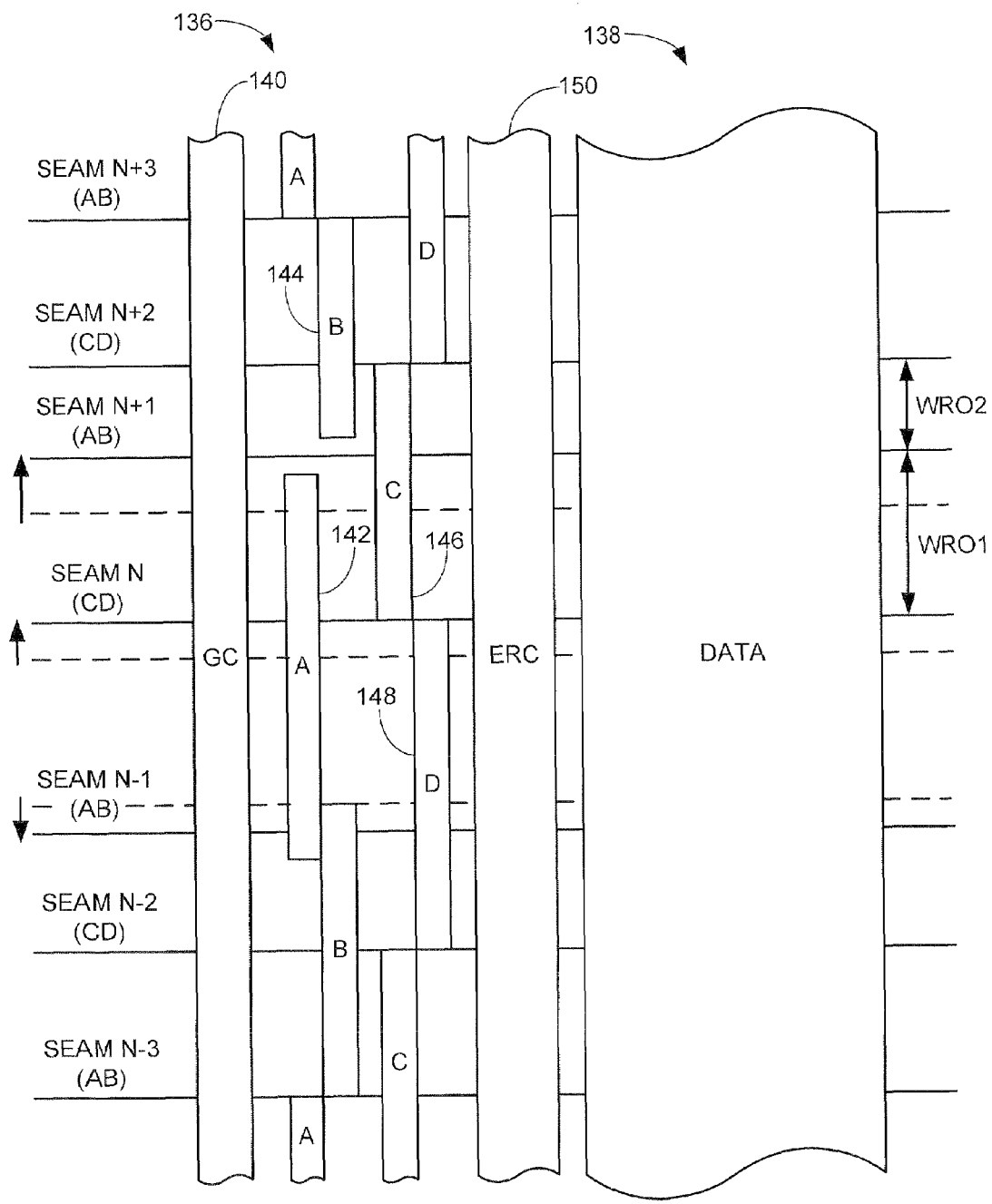
FIG. 5 correspondingly represents portions of the data storage medium with misplaced seams which provide repeated runout (RRO) error.

For example, seam N for the selected spoke 136 in FIG. 5 is shown to be displaced upwardly (i.e., toward the center 130 of the medium 110) as compared to the ideal location for this seam from FIG. 4 (shown in broken line fashion). The associated CD patterns 146, 148 at seam N still meet at their respective corners, but the junction is displaced from the desired location.

Seam N+1 for the selected spoke 136 is also displaced upwardly, but a gap is provided between the associated AB patterns 142, 144. Seam N−1 is displaced downwardly (away from center 130), and the associated C pattern 146 overlaps the associated D pattern 148. It is contemplated that other types of placement errors can readily occur apart from those exemplified in FIG. 5. It is further contemplated that similar types of errors may also be present in the remaining servo spokes along a given seam around the medium 110, resulting in RRO as previously depicted in FIG. 3.

It can be seen that the WRO values for the seams illustrated in FIG. 5 deviate from those of FIG. 4; for example, a WRO1 value between seams N and N+1 for the spoke 136 in FIG. 5 is larger than the nominal WRO value, while a WRO2 value between seams N+1 and N+2 is smaller than the nominal WRO value. Because the WRO between seams now differs, the servo gains at the location of the altered WRO may also be non-linear, provide sub-optimal position control results.

Errors in servo bursts and seam placement accordingly require correction on the part of the servo controller 126 (FIG. 1) in order to accurately place the transducer 112 over the actual desired radial location on the medium 110. In a preferred embodiment, the ERC fields 150 store a correction value for each seam generally indicative of a radial offset between an actual position and a desired position of the associated seam. The radial offsets can be expressed, for example, in terms of a number of correction steps needed to advance the transducer from the actual location of the seam to the desired location.

Figure 6:
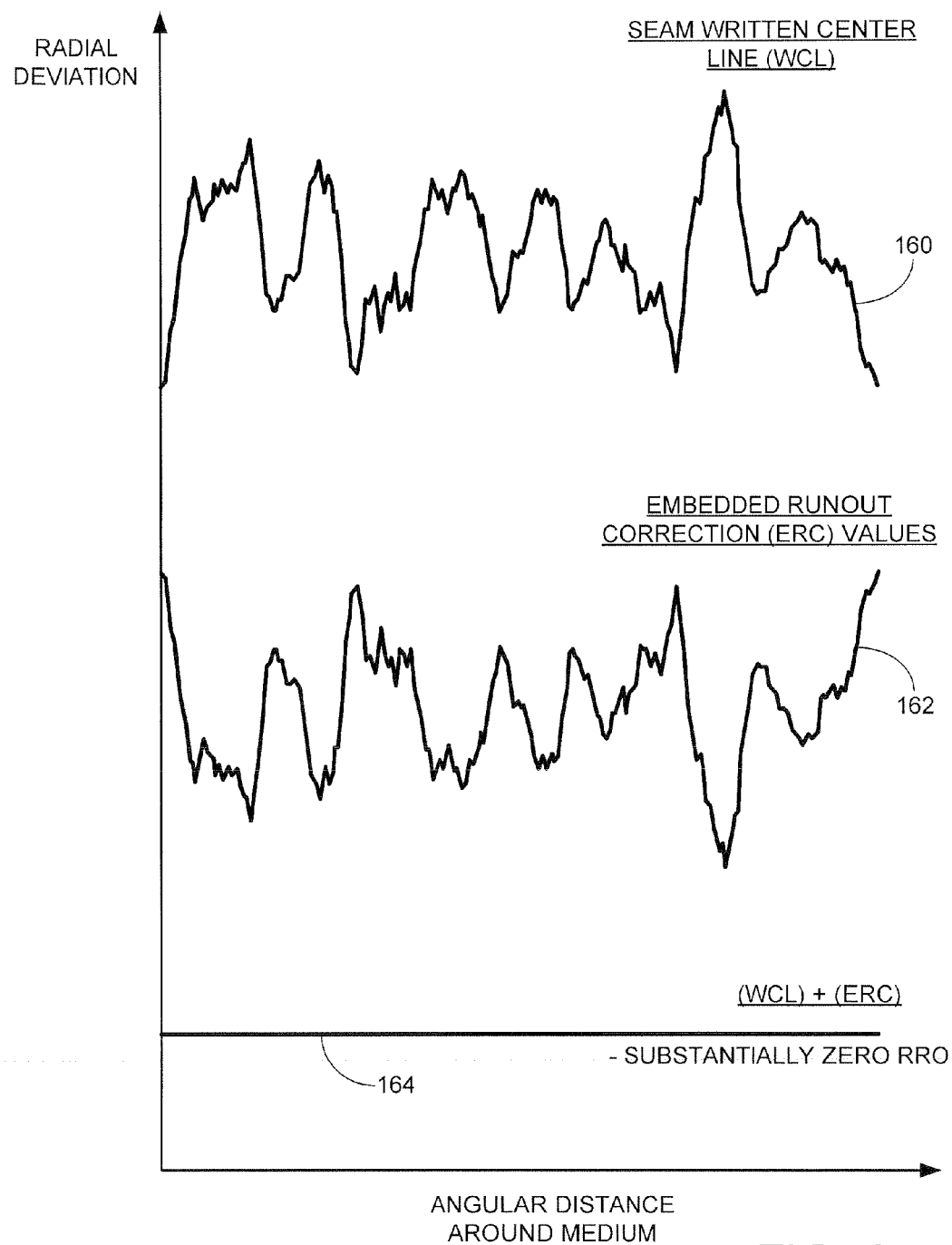
FIG. 6 provides an exemplary servo seam, or written centerline (WCL) from FIG. 5 and a corresponding RRO correction value in the form of an embedded runout correction (ERC) used to compensate for RRO error in the WCL.

FIG. 6 graphically represents a written center line (WCL) 160 made up of particular seams at a selected radial location of the medium 110. For reference, it will be contemplated that the WCL 160 in FIG. 6 corresponds to the seam N in FIGS. 4-5 for all of the servo spokes 136 around the circumference of the medium. The WCL 160 can be seen to include a significant amount of RRO error due to placement errors of the associated CD dibit patterns in each spoke. Without the application of RRO compensation, a command by the servo circuit 120 to follow the WCL 160 in FIG. 6 would generally result in the associated transducer 112 taking a trajectory substantially matching the shape of the WCL 160 over each revolution of the medium 110.

ERC correction values to compensate for such RRO are generally denoted at 162. The ERC values are substantially the mirror opposite (negative) of the WCL values. In this way, when the transducer 112 is servoing along the WCL 160, the servo circuit 120 can generate a position error signal (PES) based on the WCL, as well as transduce the associated corrective ERC value from the ERC fields 150 (FIG. 5). These latter two inputs will cancel each other out, permitting the transducer 112 to nominally follow a concentric path with substantially no RRO error, as generally represented by zero RRO path 164.

The correction values 162 for the WCL (seam) 160 can be determined in a number of known ways, such as by reading the WCL over one or more rotations of the medium 110 and noting the variations (e.g., PES) errors encountered for each spoke 136. The corresponding correction values 162 can thereafter be readily calculated and, as desired, stored in the associated ERC fields 150 (FIGS. 4-5).

Figure 7:
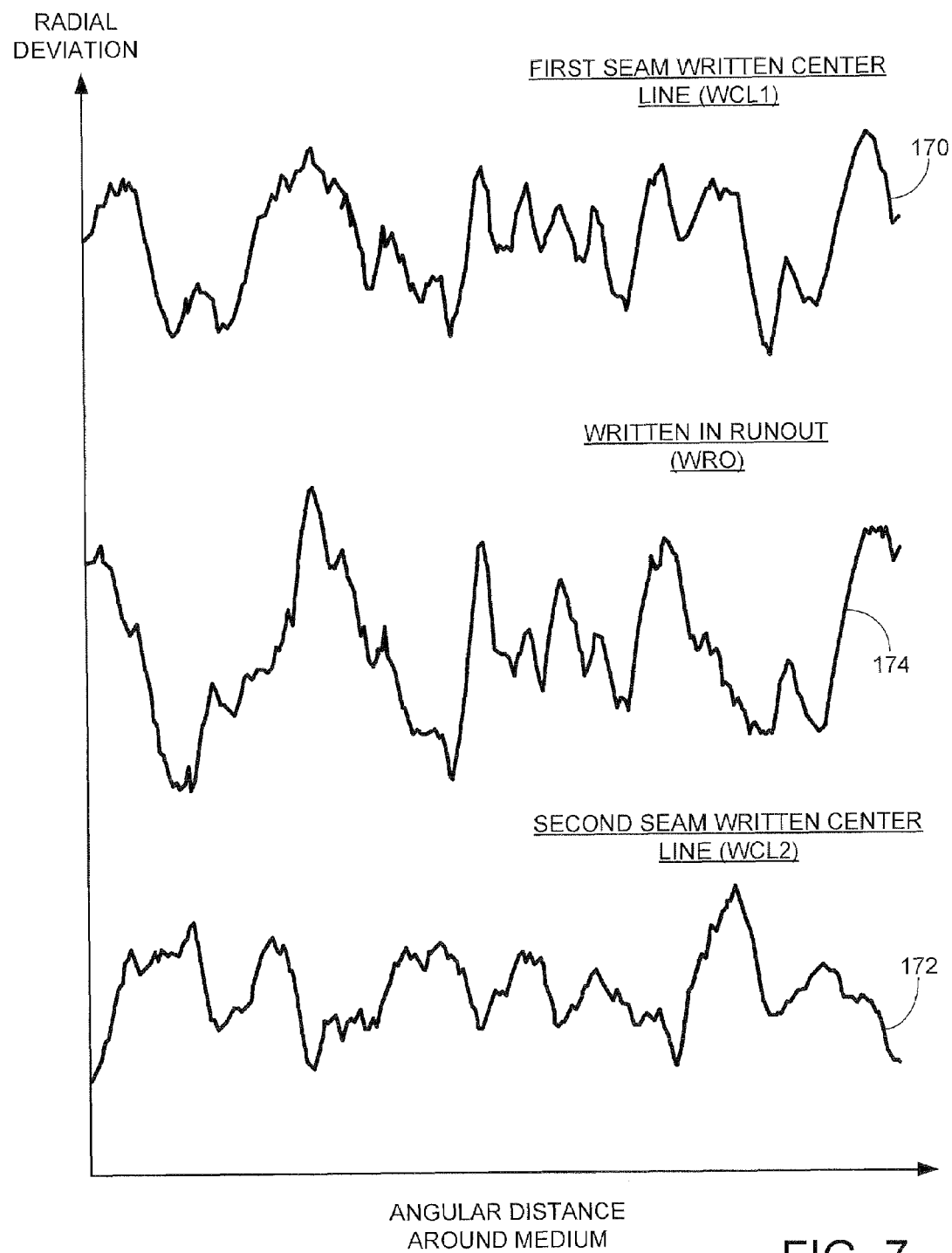
FIG. 7 shows exemplary first and second servo seams ($WCL_1$ and $WCL_2$) and a written runout (WRO) value indicative of a separation distance between the first and second servo seams.

FIG. 7 shows respective first and second seam written center lines 170, 172 for respectively adjacent first and second seams. The center lines 170, 172 are denoted as WCL1 and WCL2 and are contemplated as corresponding to the Seam N and Seam N+1 of FIGS. 4-5, respectively. Corresponding Written in Runout (WRO) values are shown at 176 and are generally indicative of a radial separation distance between the adjacent seams (WCLs) 170, 172. The WRO values 176 are preferably determined in relation to the actual radial distance R between the adjacent seams and an average distance between the seams AVG, such as in accordance with the following relationship:

$$WRO = R - AVG \qquad (1)$$

The relationship between the written centerline, the seam spacing, and the WRO facilitates the efficient processing of the ERC correction values for a particular medium 110. With knowledge of the WCL of a first seam (such as the WCL1 170 in FIG. 7) and knowledge of the WRO between that seam and a second seam (such as WRO 174 in FIG. 7), the WCL$_2$, and hence the ERC$_2$, for the second seam can be readily determined. For example, this relationship can be expressed as follows:

$$ERC_2 \approx ERC_1 + WRO_{12} \qquad (2)$$

where ERC$_2$ is the correction value for the second seam, ERC$_1$ is the correction value for the first seam, and WRO$_{12}$ is the WRO between the first and second seams.

Figure 8:
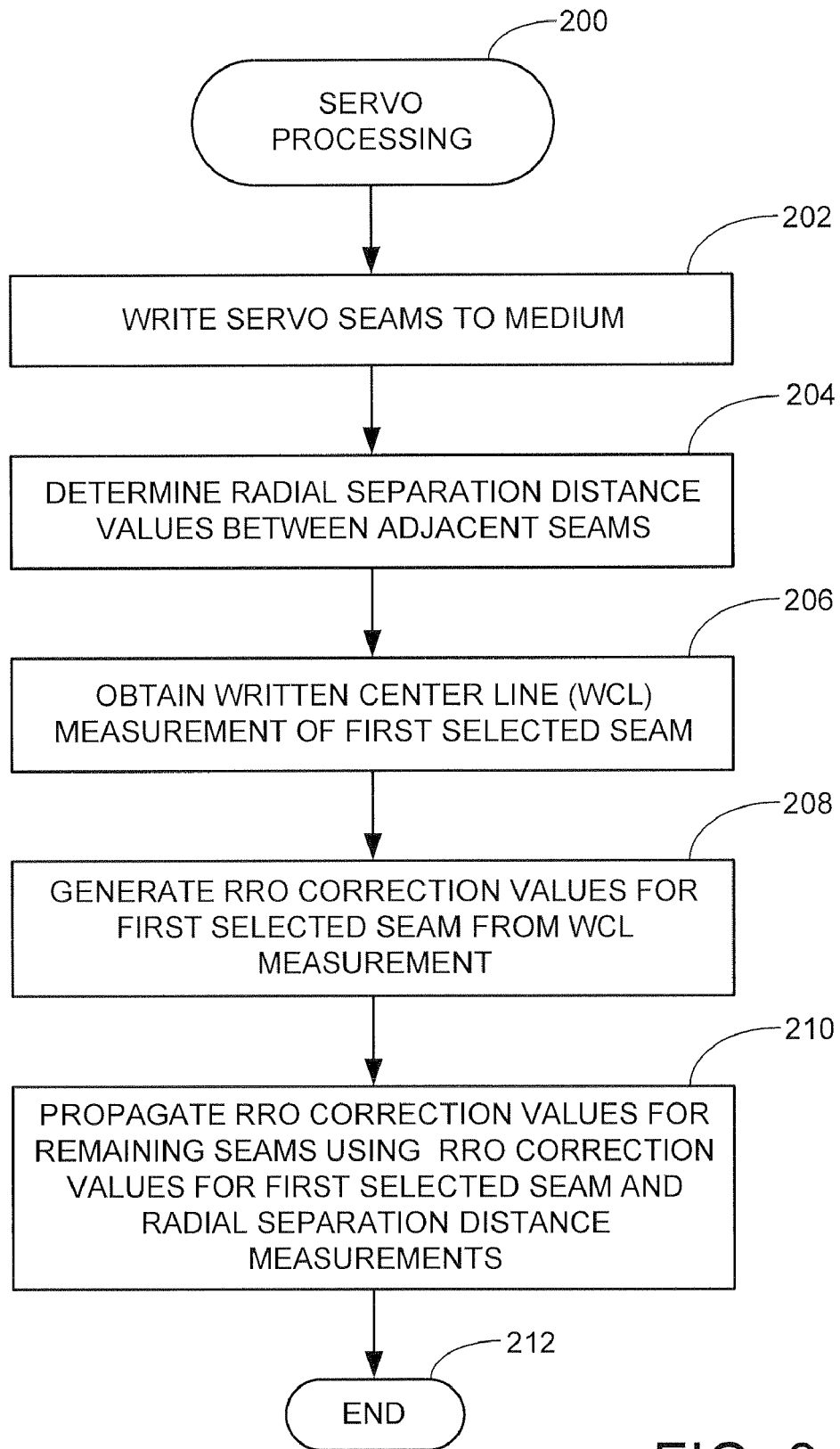
FIG. 8 provides a flow chart for a SERVO PROCESSING routine, generally illustrative of steps carried out in accordance with various embodiments of the present invention.

FIG. 8 sets forth a SERVO PROCESSING routine 200, generally illustrative of steps carried out in accordance with various embodiments of the present invention. The various steps of FIG. 8 are preferably carried out by the data storage device 100 during a servo write operation to write the servo data 136 to each recording surface in turn, although such is not limiting.

At step 202, the servo data are first formed on the associated recording surface. This can be carried out in a number of ways, such as in a self-servo write mode wherein a sequence of spirals are initially written to the surface using a servo track writer (STW), followed by the device 100 operating to incrementally write the servo wedges 136 while servoing on these spirals. During each pass, the servo dibit patterns (e.g., ABCD patterns 142-148) may be stitched together or trimmed by subsequent passes in order to establish a corresponding number of servo seams.

At step 204, radial separation distance values are determined between adjacent pairs of servo seams. The radial separation distance values are preferably characterized as WRO measurements, and are preferably taken across the radial width of the medium surface between each adjacent pair of servo seams. This can be carried out as discussed above, and will preferably result in the accumulation of WRO values on a per sector (wedge) basis, as set forth in FIGS. 5 and 7. The WRO measurement values are preferably stored in memory for subsequent recall, such as in data sectors on guard tracks of the medium 110 or in a separate memory location in a host system coupled to the device 100.

A written center line (WCL) for a selected seam on the medium is next determined at step 206. This can be carried out as discussed above to characterize the deviation of the path defined by the actual locations of the servo data at that general radius on the medium. Exemplary WCLs obtained during this step include 160 in FIG. 6 and 170 in FIG. 7.

At step 208, correction values for the selected seam are obtained to compensate for the RRO error in the WCL of step 206. Preferably, but not by limitation, the correction values are ERC values obtained as the negative of the WCL values. The ERC values obtained during step 208 are stored to an appropriate memory location, such as the ERC fields 150 in FIGS. 4-5 for the selected seam.

RRO correction values are next determined for a second servo seam on the medium at step 210. This is preferably carried out by determining a second correction value for the second servo seam adjacent the first seam in relation to the radial separation distance (e.g., WRO$_{12}$) and the first correction value for the first servo seam (e.g., the ERC$_1$ values).

Preferably, this process continues in a propagation operation whereby correction values are propagated to a number of remaining adjacent seams on the medium 110. For example, once the correction values (e.g., ERC2) are determined for the second seam, the correction values are further similarly determined for a third adjacent seam (e.g., ERC$_3$=ERC$_2$+WRO$_{23}$), and so on until the last seam is processed.

More generally, the preferred propagation operation of step 210 involves an additional population of N adjacent servo seams on the medium 110, so that an RRO correction value is determined for each servo seam M in the population N in relation to the previously determined RRO correction value for an adjacent servo seam M-1 (e.g., ERC$_{M-1}$) and a radial distance value between said seams M and M-1 (e.g., WRO$_{M-1, M}$).

The first servo seam of step 208 can be at any suitable location, such as at a distal extent of the recording surface (i.e., adjacent an innermost diameter ID or an outermost diameter OD), or at a medial location of the surface. The propagation of correction values can then proceed across the medium in one, or both, radial directions (e.g., toward the ID, toward the OD, toward both, etc.).

The correction value propagation can also be carried out on a zone basis; for example, a plurality of concentric zones can be defined on the surface and a "seed" servo seam can be selected from each, enabling the correction values in each zone to be propagated from the associated seed seam. Multiple correction values can also be determined for the same seam from multiple propagation directions for both calibration and quality assurance verification. Such multiple correction values can also be averaged or otherwise combined to provide a final set of correction values. The routine then ends at step 212.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:

obtaining a first repeated runout (RRO) correction value for a first servo seam on a storage medium by determining a written center line (WCL) value of the first servo seam indicative of radial deviation of the seam around a full circumference of the medium, and generating the first RRO correction value as an inverse of the WCL value, wherein a sum of the first RRO correction value and the WCL value provides a path along the first servo seam with substantially zero RRO to compensate for a radial offset between an actual position and a desired position of the first servo seam;

determining a distance value indicative of a radial distance between the actual position of the first servo seam and an actual position of a second servo seam on the medium; and generating a second RRO correction value for the second servo seam to compensate for a radial offset between the actual position and a desired position for the second servo seam, the second error correction value determined in relation to the first error correction value and the radial distance value.

2. The method of claim 1, wherein the obtaining step comprises reading data associated with the first servo seam to determine the first RRO correction value.

3. The method of claim 2, wherein the obtaining step further comprises reading data associated with the first servo seam over multiple sequential revolutions of the medium to determine the first RRO correction value.

4. The method of claim 1, wherein the obtaining step comprises storing the first and second RRO correction values on the storage medium in an embedded runout correction (ERC) region of a servo burst.

5. The method of claim 1, wherein a common dibit pattern on the medium has respective opposing edges with each said edge forming a portion of the first and second servo seams, respectively.

6. The method of claim 1, wherein the distance value of the determining step comprises a written runout (WRO) value determined in relation to a radial separation distance between the first and second servo seams and an average separation distance between the first and second servo seams.

7. The method of claim 6, wherein the second RRO correction value is determined in relation to a sum of the first RRO correction value and the WRO value.

8. The method of claim 1, wherein the second servo seam is disposed radially between the first servo seam and a third servo seam on the medium, and wherein the method further comprises determining a third RRO correction value for the third servo seam to compensate for a radial offset between the actual position and a desired position for the third servo seam, the third error correction value determined in relation to the second error correction value determined in the generating step and a radial distance value between the second and third servo seams.

9. The method of claim 1, wherein an additional population of 1 to N adjacent servo seams are provisioned on the medium, and wherein the method further comprises propagating corresponding RRO correction values for each servo seam M in said N adjacent servo seams in relation to a previously determined RRO correction value for an adjacent servo seam M−1 and a radial distance value between said seams M and M−1.

10. The method of claim 1, wherein the first and second servo seams are each defined by respectively abutting servo dibit patterns in a plurality of spaced apart, radially extending servo wedges on the medium.

11. The method of claim 1, further comprising adjusting a position of a transducer adjacent the storage medium using the second RRO correction value.

12. An apparatus comprising:
a servo controller configured to obtain a first repeated runout (RRO) correction value for a first servo seam on a storage medium by determining a written center line (WCL) value of the first servo seam indicative of radial deviation of the seam around a full circumference of the medium, and generating the first RRO correction value as an inverse of the WCL value, wherein a sum of the first RRO correction value and the WCL value provides a path along the first servo seam with substantially zero RRO to compensate for a radial offset between an actual position and a desired position of the first servo seam, and to estimate a second RRO correction value for an adjacent second servo seam on the medium in relation to the first RRO correction value and a distance value indicative of a radial distance between the actual position of the first servo seam and an actual position of the second servo seam on the medium.

13. The apparatus of claim 12, further comprising said storage medium, wherein the first and second servo seams are each defined by respectively abutting servo dibit patterns in a plurality of spaced apart, radially extending servo wedges on the medium.

14. The apparatus of claim 13, further comprising a data transducer controllably positionable adjacent the storage medium, wherein the servo controller obtains the first RRO correction value in relation to read signals transduced by the transducer while the transducer is positioned adjacent the first servo seam.

15. The apparatus of claim 14, wherein the servo controller is further configured to direct storage of the second RRO correction value by the transducer to a field on the medium adjacent the second servo seam.

16. The apparatus of claim 12, wherein the servo controller obtains the first RRO correction value by directing a transducer to transduce read signals from the medium adjacent the first servo seam.

17. The apparatus of claim 12, wherein the distance value comprises a written runout (WRO) value determined in relation to a radial separation distance between the first and second servo seams and an average separation distance between the first and second servo seams.

18. The apparatus of claim 12, wherein the first servo seam is disposed adjacent a selected one of an innermost diameter (ID) or an outermost diameter (OD) of the storage medium, and the servo controller further operates to propagate RRO correction values to each of N adjacent servo seams provisioned on the medium in a direction toward the remaining one of the ID and OD, wherein said propagation comprises estimating corresponding RRO correction values for each servo seam M in said N adjacent servo seams in relation to a previously determined RRO correction value for an adjacent servo seam M−1 and a radial distance value between said seams M and M−1.

19. The apparatus of claim 12, wherein the first servo seam is radially disposed in a medial location of the storage medium, wherein the servo controller further operates to propagate RRO correction values to each of N adjacent servo seams provisioned on the medium in both a first direction toward an innermost diameter (ID) of the medium from the first servo seam and in a second direction toward an outermost diameter (OD) of the medium from the first servo seam, and wherein said propagation comprises estimating corresponding RRO correction values for each servo seam M in said N adjacent servo seams in relation to a previously determined RRO correction value for an adjacent servo seam M−1 and a radial distance value between said seams M and M−1.

20. An apparatus comprising:
a storage medium on which a plurality of radially concentric servo seams are disposed; and
first means for obtaining a first repeated runout (RRO) correction value for a first servo seam of said plurality by determining a written center line (WCL) value of the first servo seam indicative of radial deviation of the seam around a full circumference of the medium, and generating the first RRO correction value as an inverse of the WCL value, wherein a sum of the first RRO correction value and the WCL value provides a path along the first servo seam with substantially zero RRO to compensate for a radial offset between an actual position and a desired position of the first servo seam, and to generate a second RRO correction value for an adjacent second servo seam of said plurality in relation to the first RRO correction value and a distance value indicative of a radial distance between the actual position of the first servo seam and an actual position of the second servo seam on the medium.

* * * * *